United States Patent
Bergqvist

(10) Patent No.: US 10,360,722 B2
(45) Date of Patent: Jul. 23, 2019

(54) BASE MEMBER AND AN RFID MEMBER FOR 3D IMAGE CREATION

(71) Applicant: ADVANCED TECHNICAL SOLUTIONS IN SCANDINAVIA AB, Molndal (SE)

(72) Inventor: Goran L. Bergqvist, Lindome (SE)

(73) Assignee: ADVANCED TECHNICAL SOLUTIONS IN SCANDINAVIA AB, Molndal (SE)

( * ) Notice: Subject to any disclaimer, the term of this patent is extended or adjusted under 35 U.S.C. 154(b) by 58 days.

(21) Appl. No.: 15/572,991

(22) PCT Filed: May 18, 2016

(86) PCT No.: PCT/SE2016/050448
§ 371 (c)(1),
(2) Date: Nov. 9, 2017

(87) PCT Pub. No.: WO2016/186557
PCT Pub. Date: Nov. 24, 2016

(65) Prior Publication Data
US 2018/0144543 A1  May 24, 2018

(30) Foreign Application Priority Data
May 19, 2015 (SE) ...................................... 1530070

(51) Int. Cl.
*G06T 17/05* (2011.01)
*G01B 21/04* (2006.01)
(Continued)

(52) U.S. Cl.
CPC ............ *G06T 17/05* (2013.01); *G01B 21/042* (2013.01); *G01C 15/002* (2013.01); *G01C 15/02* (2013.01);
(Continued)

(58) Field of Classification Search
CPC .......... G06T 17/05; G06T 2207/10028; G01C 15/02; G01C 15/002; G06K 19/0772; G01B 21/042
See application file for complete search history.

(56) References Cited

U.S. PATENT DOCUMENTS

2003/0052875 A1    3/2003  Salomie
2006/0214791 A1*   9/2006  Tethrake .............. G06K 19/041
                                                          340/572.1
(Continued)

OTHER PUBLICATIONS

International Search Report, dated Aug. 30, 2016, from corresponding PCT/SE2016/050448 application.

*Primary Examiner* — Maurice L. McDowell, Jr.
(74) *Attorney, Agent, or Firm* — Young & Thompson

(57) ABSTRACT

Disclosed is a base member for use with a plurality of interchangeable reference members. The base member is intended to be connected to an element of a scene and includes a first surface and a second surface, a hole adapted to receive a fastening member for connecting the base member to the element, and a connecting portion adapted to detachably connect a reference member to the base member. The base member also includes a cavity adapted to receive and hold an RFID member, which cavity is coaxial with the hole, connects the hole and the second surface and has a smallest diameter larger than the largest diameter of the hole. Also disclosed is an RFID member adapted to fit in the cavity of the base member to cover the hole in the base member.

20 Claims, 2 Drawing Sheets

(51) Int. Cl.
*G06K 19/077* (2006.01)
*G01C 15/00* (2006.01)
*G01C 15/02* (2006.01)

(52) U.S. Cl.
CPC ............ *G06K 19/0772* (2013.01); *G06T 2207/10028* (2013.01)

(56) References Cited

U.S. PATENT DOCUMENTS

| | | |
|---|---|---|
| 2007/0257903 A1 | 11/2007 | Gutierrez et al. |
| 2013/0163836 A1 | 6/2013 | Pau et al. |
| 2013/0228620 A1* | 9/2013 | Ahern ............... G01C 15/002 235/439 |
| 2014/0354528 A1 | 12/2014 | Laughlin et al. |

* cited by examiner

BASE MEMBER AND AN RFID MEMBER FOR 3D IMAGE CREATION

SUBJECT OF THE INVENTION

The present invention relates to a base member for use with a plurality of interchangeable reference members to create a 3D image of a scene and to determine coordinates of said 3D image in a geodetic frame, which base member is intended to be connected to an element of the scene. The base member comprises a first surface arranged to face the element and a second surface arranged to face away from the element. The base member further comprises a hole adapted to receive a fastening member for connecting said base member to said element and a connecting portion adapted to detachably connect a reference member to the base member.

The invention also relates to an RFID member for use with a base member according to the invention, which RFID member comprises an RFID tag.

BACKGROUND OF THE INVENTION

It is known to use a 3D scanner to create a 3D image of a scene, e.g. the inside of a factory or a room in a nuclear power plant.

Base members are attached to various elements (walls, floor, ceiling etc.) of the scene before the 3D scanning is carried out and reference members, e.g. 3D reference spheres, are removably attached to the base members. Each reference member is adapted to cooperate with the 3D scanner to determine the position of a reference point associated with the base member to which the reference member is attached. This means that each base member is associated with a reference point.

The 3D scanner is positioned at several locations, strategically chosen so that every element within the scene is covered, and for each of these locations a data acquisition process is carried out. Each acquisition process results in a point cloud that represents the part of the scene visible from the corresponding location. Some of the points in the point clouds correspond to the reference points associated with the base members and this information is used to merge said point clouds into a single point cloud that represents the entire scene.

It is also known to determine the coordinates of the reference points associated with the base members in a geodetic frame.

For this purpose, a different type of reference member, e.g. a prism or a reflector, is attached to the base members and standard surveying equipment, e.g. a total station, is used to determine the coordinates of the reference points in the geodetic frame.

Information related to each base member is stored in a database. Suitable information is, for example, which type of element (door, window, closet etc.) the base member is connected to, the dimensions of the element and the coordinates of the reference point of the base member. Each base member has an identification number (usually written on a plaque located next to the base member) and this identification number can be used to access the information stored in the database.

A user with access to the database may use the stored information, for example, to create an accurate 3D image of the scene and to acquire specific information relating to each element and base member.

OBJECT OF THE INVENTION

A first object of the invention is to simplify the above described process.

A second object of the invention is to improve the reliability of said process.

DEFINITIONS

A reference member is a device that can be used to determine the location of a reference point of a base member connected to the reference member.

One type of reference member, e.g. a 3D reference sphere, is suitable for use with a 3D scanner. The reference member is connected to a base member and can be used to determine the location of a reference point in a point cloud generated by the 3D scanner.

Another type of reference member, e.g. a prism or a reflector, can be used in combination with surveyor equipment, e.g. a total station, to determine the coordinates (in three dimensions) of a reference point in a geodetic frame.

A reference point associated with a base member may be located anywhere on or within the base member. The reference point is suitably located on the surface and at the centre of said base member.

Note that each reference member has its own reference point. For example, the reference point of a 3D reference sphere is located at the centre of said sphere. Since the positional relation of the reference point of the reference member and the reference point of the base member is known when the reference member is connected to the base member, the identified location of the reference point of the reference member can be used to determine the location of the reference point of the base member.

A geodetic frame is a coordinate system, and a set of control points, used to locate places on the Earth. A geodetic frame may be global as well as local. Examples of geodetic frames are SWEREF (the Swedish national geodetic frame) and ETRS89 (a European geodetic frame).

An RFID member is a part comprising an RFID tag. The RFID tag in itself may constitute an RFID member. Alternatively, the RFID tag may be connected to or encapsulated in a part that constitutes the RFID member.

SUMMARY OF THE INVENTION

The objects of the invention are achieved with a base member as defined above, which base member is characterised in that it comprises a cavity adapted to receive and hold an RFID member. This cavity is coaxial with the hole (for the fastening member), connects the hole and the second surface and has a smallest diameter larger than the largest diameter of the hole, to allow the RFID member to be arranged in the cavity in such a way that said RFID member prevents access to a fastening member arranged in the hole.

The fact that the cavity is adapted to hold an RFID member that prevents access to the fastening member arranged in the hole ensures that the base member cannot be removed from the element to which it is attached by means of said fastening member without also removing the RFID member from the base member. This arrangement makes it difficult for any person to remove the base member from the element. Most importantly, it reduces the risk that an unauthorized person, who perhaps does not understand the function of the base member, moves or removes the base member from the element.

Another advantage of using a base member adapted to be connected to detachable reference members adapted to cooperate with a 3D scanner and suitable surveyor equipment to determine the location of the reference point of the base member is that the RFID member may be connected to the base member, so that the same reference member may be used on a plurality of base members.

Advantageously, the base member comprises retaining means to ensure that the RFID member remains in the cavity. This arrangement makes it even more difficult for an unauthorized person to remove the RFID member. The base member may, for example, be provided with a snap fit element forming part of a snap fit connection adapted to cooperate with the RFID member to prevent the RFID member from being removed from the cavity. Another suitable retaining means is an adhesive applied on at least a portion of the inside of the cavity, which portion is arranged to come into contact with the RFID member. An adhesive may also be applied on the RFID member.

Advantageously, the cavity has a shape such that the RFID member remains fixated in the cavity. This ensures that the RFID member remains in the cavity during use. The cavity may, for example, have a shape such that the RFID member fits tightly in the cavity.

The diameter of the cavity and the diameter of the hole are measured in respective planes extending in parallel and perpendicular to a longitudinal axis of said hole.

Advantageously, the cavity has a circular cross-section. However, the cavity may have any suitable shape.

The diameter of the cavity is suitably within the range 9.5-24 mm. In a particularly advantageous embodiment, wherein the cavity has a circular cross-section, the cavity has a diameter of 12±0.2 mm and a depth 3±0.05 mm.

Any information associated with at least one base member may be stored directly in the RFID member connected to the base member. Any information associated with at least one base member may also or alternatively be stored in a database arranged to communicate with the RFID member connected to the base member.

The use of RFID members makes it easier for a user to acquire and enter information related to the scene. An authorized user may now use a handheld device, e.g. a smart phone, to acquire information directly from an RFID member or a database arranged to communicate with said RFID member. An authorized user may also use said handheld device to enter information into said RFID member or database.

Advantageously, at least a part of the base member comprises a magnetic material. This arrangement makes it easy to connect a reference member comprising a magnet to the base member as well as to remove the reference member from the base member. However, other types of connections are possible, such as a snap fit connection.

The connecting portion should be adapted to be connected to at least one type of reference member that can be used to determine the coordinates (in three dimensions) of the reference point associated with the base member in a geodetic frame.

The connecting portion should also be adapted to be connected to at least one type of reference member that can be used together with a 3D scanner to determine the location of the reference point associated with the base member in a point cloud representing a scene or a part of scene.

Advantageously, the base member is dimensioned to achieve a tight fit with the reference members to ensure that the reference members assume the same position in relation to the base member every time they are mounted on the base member. The dimensions of the base member may also be dependent on the characteristics of the connection between the base member and the reference members.

Advantageously, the base member has a thickness of at least 3 mm and even more advantageously at least 6 mm.

Advantageously, the base member has a diameter of at least 36 mm.

In a particularly advantageous embodiment, wherein the base member has a circular cross section and comprises a magnetic material, the base member has a thickness of at least 6 mm and a diameter within the range 36-36.062 mm.

The invention also relates to an RFID member for use with a base member according to any of the preceding claims, which RFID member comprises an RFID tag. The RFID member is adapted to fit in the cavity of the base member to cover the hole in the base member.

The RFID member preferably has a circular cross-section and even more preferably a cylindrical shape. The RFID member is advantageously adapted to fit tightly in the cavity in the base member.

The RFID member may be provided with retaining means adapted to fixate the RFID member in the cavity. The RFID member may, for example, be provided with an adhesive.

The RFID member may constitute an RFID tag in itself.

The invention also relates to a system comprising a base member according to the invention and at least two interchangeable reference members, which reference members may be removably connected to the base member, wherein at least one of said reference members is suitable for use with a 3D scanner to determine the location of the reference point of the base member in a point cloud generated by the 3D scanner and wherein at least one of said reference members is suitable for use in combination with surveyor equipment to determine the coordinates of the reference point of the base member in a geodetic frame. The system may also comprise an RFID member according to the invention.

DRAWINGS

The description will now be described in detail with reference to the accompanying drawings, wherein:

FIG. 2b is a top view of the base member in FIG. 2a.

DETAILED DESCRIPTION OF THE INVENTION

The invention will now be described with reference to the accompanying drawings, wherein like characters denote like or corresponding parts.

Figure 1:
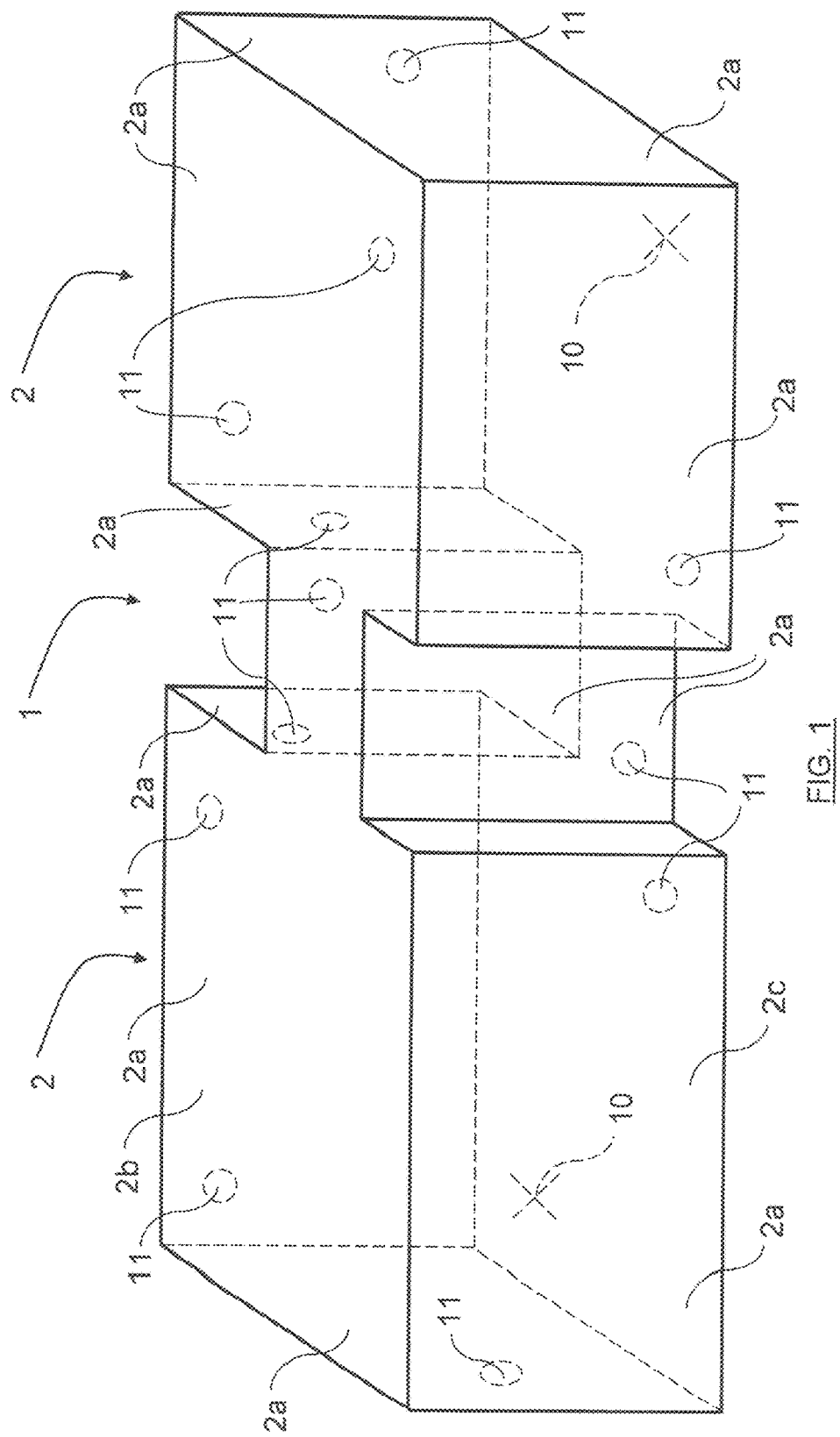
FIG. 1 is perspective view of a part of a scene comprising elements with base members according to a first embodiment of the invention attached thereto.

FIG. 1 shows a scene 1 comprising two rooms connected by a corridor. The scene comprises a plurality of elements 2 in the form of walls 2a, a ceiling 2b and a floor 2c. Additional elements in the form of fixed and movable objects (doors, closets, tables etc.) may also be included in the scene 1.

A method for generating a 3D image of the scene 1 and for determining coordinates of said 3D image in a geodetic frame will now be described with reference to FIG. 1.

In a first step, a user selects a plurality (in this embodiment two) of reference positions 10 within the scene 1. The reference positions 10 are selected so that every element 2 in the scene are visible from at least one of said reference positions 10.

Starting from a control point (located outside the scene) with known coordinates in a geodetic frame the user employs a standard surveying method, e.g. traversing, to determine the coordinates (in three dimensions) of said reference positions 10.

Base members 11 (schematically shown in FIG. 1) are mounted on some of the elements 2 within the scene 1 and each base member 11 is provided with an RFID member (not shown in FIG. 1) comprising an RFID tag. The base members 11 are preferably evenly distributed within the scene 1 to minimize the margin of error.

The user may then use a smart phone or any other suitable device to enter data into a database. Each base member 11 has an identification number associated with data relating to said base member 11 in said database. The identification number is stored in the RFID tag connected to the base member 11, so that the user may acquire said data via said RFID tag. The user may, for example, enter data relating to the element 2 (type, dimensions, colour etc.) to which the base member 11 is attached.

Thereafter, a surveyor apparatus (not shown), e.g. a total station, is positioned at one of the reference positions 10 and a reference member (not shown), e.g. a prism, is detachably connected to one of the base members 11 visible from that reference position 10. The total station and the prism are then used to determine the coordinates (in three dimensions) of the reference point of the base member 11 to which the reference member is connected. These coordinates are stored in the data base, in which they are associated with the identification number of the base member 11. This process is then repeated for every base member 11 visible from the current reference position 10. The total station is thereafter moved to the other reference position 10 and the coordinates of the reference points associated with the base members 11 visible from that reference position 10 are determined and stored in the database.

A 3D scanner (not shown) is then positioned at one of the reference positions 10 and reference members (not shown) suitable for use with a 3D scanner, e.g. 3D reference spheres, are attached to all base members 11 visible from that reference position 10. The 3D scanner may, alternatively, be positioned at a different suitable position, in which case the coordinates of that position must be determined before the 3D scanning begins, for example through knowledge of the coordinates of the reference points of the base members 11.

The 3D scanner generates a point cloud representing the scene as viewed from the current reference position 10. The 3D scanner is then moved to the other reference position 10 and the process is repeated for the base members visible from that reference position 10. The information gathered by the 3D scanner is then processed and the generated point clouds are combined into a single point cloud representing the scene 1 in its totality. This information is also stored in the database.

The reference points of the base members 11 form part of the point cloud and since the coordinates of these reference points are known, it is now possible to determine the position of the total 3D scene and its elements 2 within the geodetic frame.

An authorized user may now use a hand held device, e.g. a smart phone, to access the data stored in the database via a single RFID tag. The user may, for example, acquire information relating to the coordinates of nearby base members 11. The user may also acquire a 3D image of the entire scene 1 (or part of the scene 1) and use this information in any suitable way.

It is, of course, also possible to acquire information directly from the database by means of a computer connected to the database. A 3D image generated in this way is very accurate and can be used, for example, to build an identical copy of the scene at a different location.

It is sometimes desirable to make changes to a scene 1; perhaps a new wall is erected or a cabinet moved to a new position. In these cases, the above described process is repeated (for the relevant elements) and the new information is uploaded to the database.

It is also possible to store information such as coordinates and other data directly in the RFID tags.

Figure 2A:
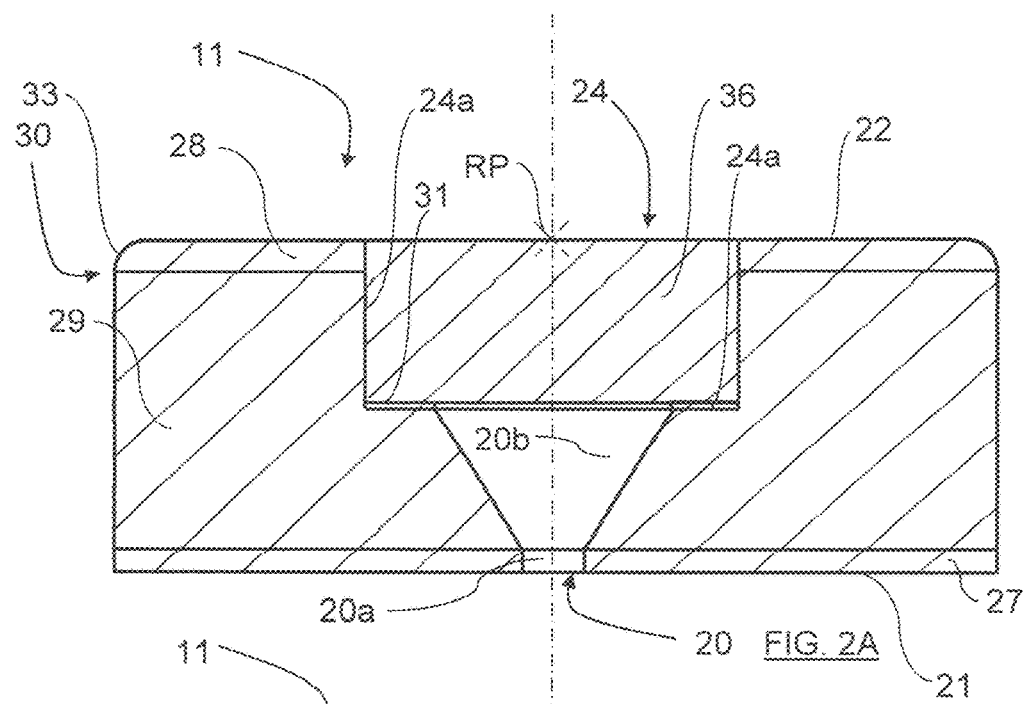
FIG. 2a is a cross section through one of the base members in FIG. 1.
Figure 2B:
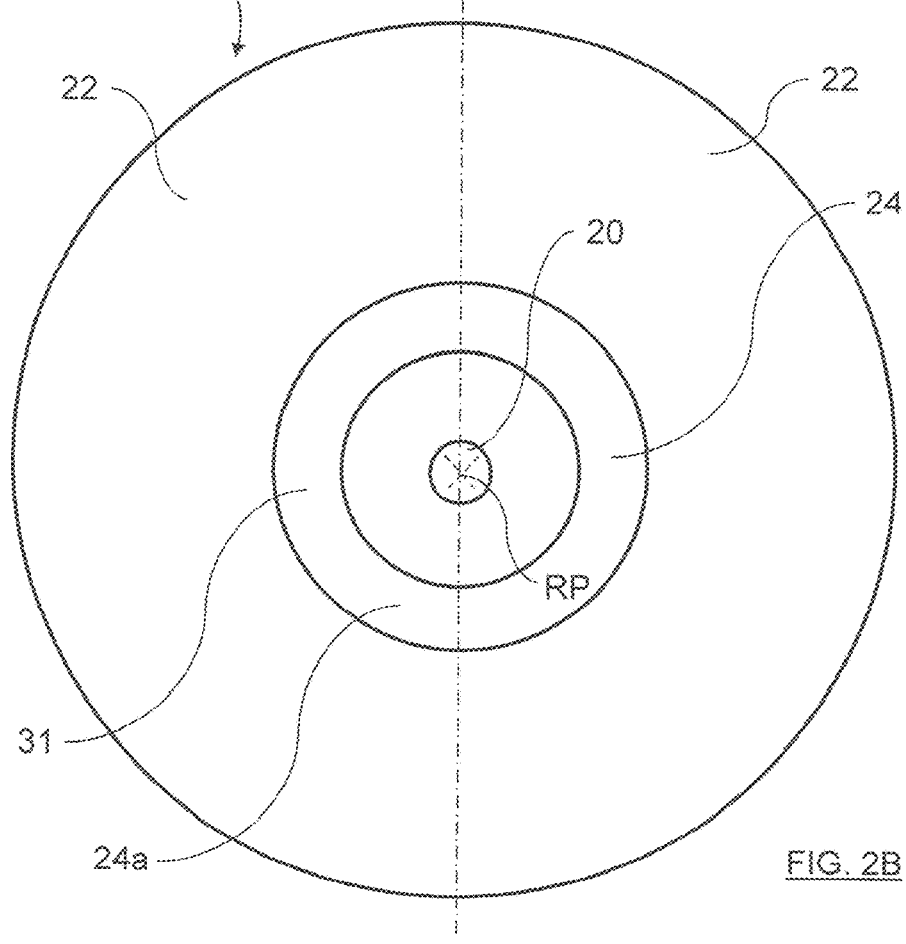

FIGS. 2a and 2b show a first embodiment of a base member 11 according to the invention.

The base member 11 in FIGS. 2a and 2b has the shape of a circular washer with a central hole 20 for a fastening member (not shown) for fastening the base member to an element (not shown in FIGS. 2a and 2b). The washer has a first surface 21, which is intended to face the element, and a second surface 22, which extends in parallel with the first surface 21 and is intended to face away from the element. The first surface 21 is flat to ensure that the base member 11 does not move after it has been mounted on the element.

The hole 20 in centre of the base member 11 is adapted to receive a fastening member (not shown), e.g. a screw, for fastening the base member 11 to the element. The hole 20 has a cylindrical outer part 20a, which connects the hole 20 to the first surface 21, and an inner part 20b that extends from the outer part 20a towards the second surface 22 of the base member 11. The inner part 20b has the shape of a truncated cone with an expanding diameter in a direction away from the first surface 21. The inner part 20b is thus adapted to receive a head of the fastening member in a tight fitting manner, to ensure that the base member 11 remains fixed in place when mounted on the element.

The inner part 20b of the hole 20 is connected to the second surface 22 of the base member 11 by a cavity 24 adapted to receive an RFID member 36 constituted by an RFID tag. The cavity 24 has a cylindrical shape (coaxial with the hole 20) and both the cavity 24 and the RFID member 36 are dimensioned to ensure a tight fit between inner walls 24a of the cavity and the RFID member 36. The diameter of the cavity 24, measured in a first plane, is larger than the largest diameter of the hole 20 for the fastening member, which largest diameter is measured in a second plane extending in parallel with the first plane and perpendicular to a longitudinal axis of the hole 20. Thus is ensured that the RFID member 36 covers the entire head of the fastening member and prevents access to the fastening member from the second surface 22 of the base member 11.

The cavity 24 shown in FIGS. 2a and 2b has a cylindrical shape. In alternative embodiments, the cavity may have a tapered inside or any suitable shape adapted to receive and retain an RFID member 36.

It is not necessary that the cavity 24 is adapted to receive the entire RFID member 36, although such a solution is advantageous in that it makes the RFID member 36 more difficult to remove and may prevent the RFID member 36 from interacting with a reference member attached to the base member 11.

The base member 11 comprises a first protective layer 27, which defines the first surface 21 of the base member 11, a second protective layer 28, which defines the second surface 22 of the base member 11, and a core 29 located between the first and second protective layers 27, 28. The protective layers 27, 28 are made of a suitable protective material, e.g. zinc, and the core 29 is at least partly made of a magnetic material, e.g. iron.

The second protective layer 28 and the core 29 define a connecting portion 30 adapted to be connected to a reference member (not shown in FIGS. 2a and 2b). The reference member is adapted to be mounted on the base member 11 so that the second protective layer 28 and a part of the core 29 is received within a space defined by a corresponding connecting portion of the reference member. An outer rim 33 of the second protective layer 28 has a curvature adapted to cooperate with a corresponding surface on the connecting portion of the reference member, to ensure that the reference member assumes the same position in relation to the base member 11 every time it is connected to the base member 11. The reference members are provided with identical connecting portions and thus can be ensured that the positon of the reference points of the reference members in relation to the position of a reference point RP of the base member 11 is the same for all reference members when attached to the base member 11.

At least a part of the core 29 is made of a magnetic material so that it is adapted to create a magnetic connection with a magnet in the reference member.

The reference point RP of the base member 11 is in this embodiment located at the centre point of the second surface 22 of the base member 11. In alternative embodiments the base member 11 may have a different shape and the reference point RP may be located elsewhere on or within the base member 11.

In the embodiment shown in FIGS. 2a and 2b, the RFID member 36 is secured in the cavity 24 by means of a retaining means 31 in the form of a layer of adhesive applied on the bottom of the cavity 24. In alternative embodiments, the adhesive may originally be applied on the RFID member. Other types of retaining means are also possible. For example, the base member 11 may be provided with a snap fit connection adapted to cooperate with the RFID member to ensure that the RFID member remains in the cavity.

The invention is not limited to the embodiments described above, but may be varied within the scope of the appended claims. Also, the above described embodiments and features can be amended and combined in a multitude of ways. For example, the protective layers can be removed from the base member and the reference members can be connected to the base member in many different ways.

The invention claimed is:

1. A base member (11) for use with a plurality of interchangeable reference members to create a 3D image of a scene (1) and to determine coordinates of said 3D image in a geodetic frame, which base member (11) is intended to be connected to an element (2, 2a-c) of the scene (1), which base member (11) comprises a first surface (21) arranged to face the element (2, 2a-c) and a second surface (22) arranged to face away from the element (2, 2a-c); a hole (20) adapted to receive a fastening member for connecting said base member (11) to said element (2, 2a-c); and a connecting portion (30) adapted to detachably connect a reference member to the base member (11), wherein the base member (11) comprises a cavity (24) adapted to receive and hold an RFID member (36), which cavity (24) is coaxial with the hole (20), connects the hole (20) and the second surface (22) and has a smallest diameter larger than the largest diameter of the hole (20).

2. A base member (11) according to claim 1, which base member (11) comprises at least one retaining means (31) for retaining the RFID member (36) in the cavity (24).

3. A base member (11) according to claim 2, wherein at least one retaining means (31) is an adhesive.

4. A base member (11) according to claim 3, wherein at least one retaining means is a snap fit element.

5. An RFID member (36) for use with a base member (11) according to claim 4, which RFID member (36) comprises an RFID tag, wherein said RFID member (36) is adapted to fit in the cavity (24) of the base member (11) to cover the hole (20) in the base member (11).

6. A base member (11) according to claim 4, wherein at least a part of the base member (11) comprises a magnetic material.

7. An RFID member (36) for use with a base member (11) according to claim 6, which RFID member (36) comprises an RFID tag, wherein said RFID member (36) is adapted to fit in the cavity (24) of the base member (11) to cover the hole (20) in the base member (11).

8. A base member (11) according to claim 3, wherein at least a part of the base member (11) comprises a magnetic material.

9. An RFID member (36) for use with a base member (11) according to claim 8, which RFID member (36) comprises an RFID tag, wherein said RFID member (36) is adapted to fit in the cavity (24) of the base member (11) to cover the hole (20) in the base member (11).

10. An RFID member (36) for use with a base member (11) according to claim 3, which RFID member (36) comprises an RFID tag, wherein said RFID member (36) is adapted to fit in the cavity (24) of the base member (11) to cover the hole (20) in the base member (11).

11. A base member (11) according to claim 2, wherein at least one retaining means is a snap fit element.

12. A base member (11) according to claim 11, wherein at least a part of the base member (11) comprises a magnetic material.

13. An RFID member (36) for use with a base member (11) according to claim 12, which RFID member (36) comprises an RFID tag, wherein said RFID member (36) is adapted to fit in the cavity (24) of the base member (11) to cover the hole (20) in the base member (11).

14. An RFID member (36) for use with a base member (11) according to claim 11, which RFID member (36) comprises an RFID tag, wherein said RFID member (36) is adapted to fit in the cavity (24) of the base member (11) to cover the hole (20) in the base member (11).

15. A base member (11) according to claim 2, wherein at least a part of the base member (11) comprises a magnetic material.

16. An RFID member (36) for use with a base member (11) according to claim 15, which RFID member (36) comprises an RFID tag, wherein said RFID member (36) is adapted to fit in the cavity (24) of the base member (11) to cover the hole (20) in the base member (11).

17. An RFID member (36) for use with a base member (11) according to claim 2, which RFID member (36) comprises an RFID tag, wherein said RFID member (36) is adapted to fit in the cavity (24) of the base member (11) to cover the hole (20) in the base member (11).

18. A base member (11) according to claim 1, wherein at least a part of the base member (11) comprises a magnetic material.

19. An RFID member (36) for use with a base member (11) according to claim 18, which RFID member (36) comprises an RFID tag, wherein said RFID member (36) is adapted to fit in the cavity (24) of the base member (11) to cover the hole (20) in the base member (11).

20. An RFID member (36) for use with a base member (11) according to claim 1, which RFID member (36) comprises an RFID tag, wherein said RFID member (36) is adapted to fit in the cavity (24) of the base member (11) to cover the hole (20) in the base member (11).

\* \* \* \* \*